United States Patent
Veshchikov et al.

(10) Patent No.: US 11,500,976 B2
(45) Date of Patent: Nov. 15, 2022

(54) CHALLENGE-RESPONSE METHOD FOR BIOMETRIC AUTHENTICATION

(71) Applicant: NXP B.V., Eindhoven (NL)

(72) Inventors: Nikita Veshchikov, Brussels (BE); Christine van Vredendaal, Veldhoven (NL)

(73) Assignee: NXP B.V., Eindhoven (NL)

( * ) Notice: Subject to any disclaimer, the term of this patent is extended or adjusted under 35 U.S.C. 154(b) by 205 days.

(21) Appl. No.: 17/087,752

(22) Filed: Nov. 3, 2020

(65) Prior Publication Data
US 2022/0138295 A1 May 5, 2022

(51) Int. Cl.
G06F 21/32 (2013.01)
H04L 9/32 (2006.01)
G06F 21/55 (2013.01)

(52) U.S. Cl.
CPC ............ *G06F 21/32* (2013.01); *G06F 21/554* (2013.01); *H04L 9/3271* (2013.01); *G06F 2221/031* (2013.01)

(58) Field of Classification Search
None
See application file for complete search history.

(56) References Cited

U.S. PATENT DOCUMENTS

| 6,851,051 B1 | 2/2005 | Bolle et al. |
| 6,944,315 B1 | 9/2005 | Zipperer et al. |
| 8,180,114 B2 | 5/2012 | Nishihara et al. |
| 8,396,711 B2 | 3/2013 | Yee et al. |
| 8,983,207 B1 | 3/2015 | Ran et al. |
| 10,079,024 B1 | 9/2018 | Bhimanaik et al. |
| 10,102,359 B2 | 10/2018 | Cheyer |

(Continued)

FOREIGN PATENT DOCUMENTS

| CN | 107479693 A | 12/2017 |
| CN | 208659341 U | 3/2019 |

(Continued)

OTHER PUBLICATIONS

Ducray, Benoit; "Authentication by Gesture Recognition: a Dynamic Biometric Application;" Doctoral Thesis, Royal Holloway, University of London; May 17, 2017.

(Continued)

*Primary Examiner* — Nicholas J Lee
(74) *Attorney, Agent, or Firm* — Daniel D. Hill

(57) ABSTRACT

A biometric authentication method is provided. In the method, identification information is collected from a user. A biometric scanner is used to scan a particular biometric characteristic of the user. If the user identification corresponds to the scanned biometric characteristic, then the scanner requests the user perform a predetermined action of a portion of the user's body. The predetermined action may be, for example, a hand gesture. The biometric characteristic is monitored while the predetermined action is being scanned. The scanner determines that the predetermined action is performed with the same portion of the user's body that was scanned for the biometric characteristic. The scanner determines if the portion of the user's body leaves the scanning area and monitors the scanning area for extraneous objects. The method provides more resistance against a replay attack.

20 Claims, 4 Drawing Sheets

(56) References Cited

U.S. PATENT DOCUMENTS

| | | | |
|---|---|---|---|
| 10,318,718 | B2 | 6/2019 | Watson et al. |
| 2002/0089413 | A1 | 7/2002 | Heger et al. |
| 2010/0293604 | A1 | 11/2010 | Nanda et al. |
| 2020/0195636 | A1* | 6/2020 | Landrock ............ H04L 63/0853 |

FOREIGN PATENT DOCUMENTS

| | | |
|---|---|---|
| CN | 109893093 A | 6/2019 |
| EP | 0915630 A2 | 5/1999 |
| JP | 2012527049 A | 11/2012 |
| KR | 100351264 B1 | 9/2002 |
| WO | 2020040634 A1 | 2/2020 |

OTHER PUBLICATIONS

Fong, Simon et al.; "A Biometric Authentication Model Using Hand Gesture Images;" BioMedical Engineering OnLine 12, Article No. 111 (2013); Published Oct. 30, 2013.

Morales, Aythami et al.; "On the Feasibility of Interoperable Schemes in Hand Biometrics;" MDPI Sensors 2012, vol. 12, Issue 2; Published Feb. 1, 2012; https://doi.org/10.3390/s120201352.

Sae-Bae, Napa, et al.; "Biometric-Rich Gestures: A Novel Approach to Authentication on Multi-touch Devices;" CHI 2012; CHI Conference on Human Factors in Computing Systems; May 5-10, 2012, Austin, Texas.

* cited by examiner

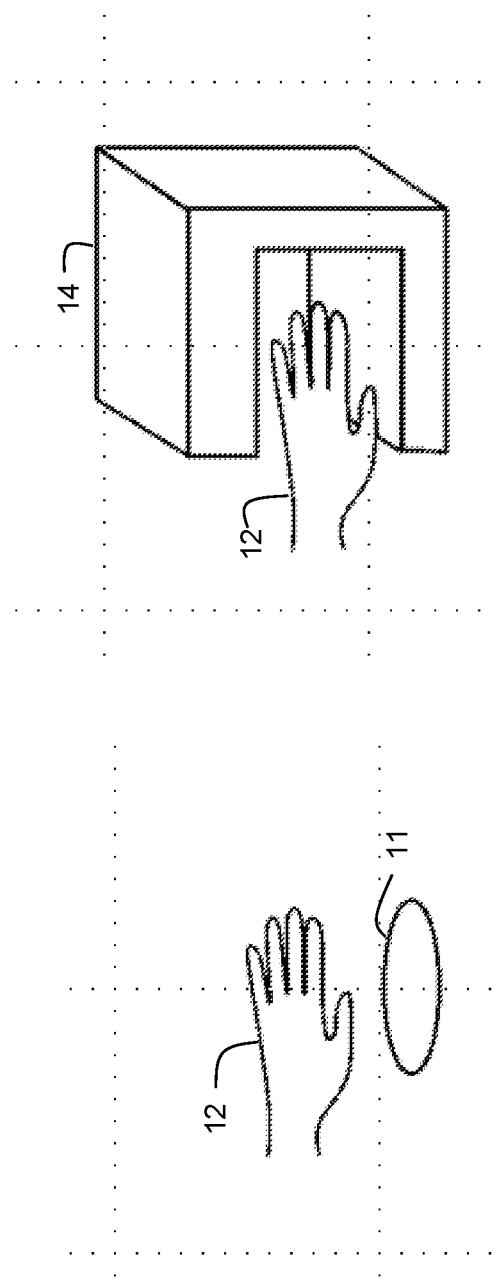

CHALLENGE-RESPONSE METHOD FOR BIOMETRIC AUTHENTICATION

BACKGROUND

Field

This disclosure relates generally to access control, and more particularly, to a challenge-response method for biometric authentication.

Related Art

A system that grants access, such as for example, to a location, information, resources, or goods, may be protected from unauthorized access using an authentication mechanism. Biometrics can be used for authenticating the identity of a person. Biometrics include characteristics about the person such as fingerprints, palm prints, facial features, voice, etc. Biometric authentication may be useful for payment applications, unlocking devices such as smartphones and unlocking doors. There are many types of attacks against biometric authentication systems. The replay attack is one type of attack that is used. During a replay attack, an attacker intercepts and records exchanged information between an authenticating user and a system to which the user is authenticating. The attacker can then "replay" the intercepted information to impersonate the user and gain access to the system. There are many types of attacks against biometric authentication systems. The replay attack is one type of attack that is used. As an example, when a user's voice is used to authenticate a person, the voice can be recorded and played back very easily. As another example, the attacker may create a fake fingerprint or an entire fake hand and present the fake hand for authentication. In yet another example, the user's body may be manipulated while unconscious, asleep, paralyzed or otherwise forced to authenticate.

What is needed is a biometric authentication method that is more resistant to a replay attack.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 1 illustrates a simplified flat one-dimensional scanner.

FIG. 2 illustrates a simplified multi-dimensional scanner.

DETAILED DESCRIPTION

Figure 3:
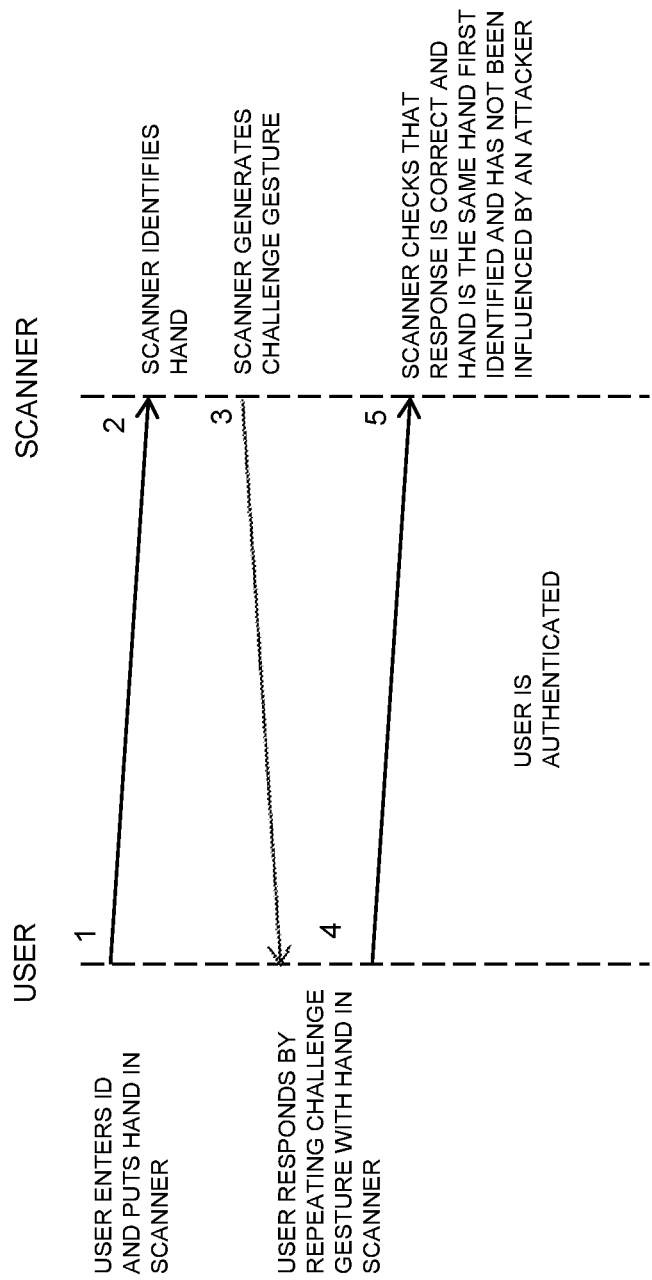
FIG. 3 illustrates challenge-response exchange between a user and a scanner in accordance with an embodiment.

Generally, there is provided, a biometric authentication method in accordance with an embodiment. Initially, identification information is collected from a user. The identification information may be provided to a scanner using a keypad, smartcard, smartphone or other mechanism. The identification information may include a predetermined biometric characteristic such as a fingerprint, vein pattern, or the like. The scanner scans a predetermined part of a user's body for the biometric characteristic. If the user's identification corresponds to the scanned biometric characteristic, then a challenge-response exchange between the user and the scanner begins. As the challenge, the scanner requests the user to perform a predetermined action of a portion of the user's body. The predetermined action may be, for example, a hand gesture. As a response to the challenge, the user provides the portion of the user's body within view of the scanner while the predetermined action is performed. To provide resistance to a replay attack, the biometric characteristic is monitored while the predetermined action is being scanned. The scanner checks that the predetermined action is being performed with the same portion of the user's body that was scanned for the biometric characteristic. Also, the scanner determines if the portion of the user's body leaves the scanning area and monitors the scanning area for extraneous objects. In this way, the method provides more resistance to a replay attack.

In one embodiment, there is provided, a method for biometric authentication, the method including: receiving, by an authenticating device, identification information about a user; scanning the user for a biometric characteristic of a portion of the user's body using the authenticating device; using the identification information, determining that the biometric characteristic belongs to the user; while the user's biometric characteristic is still being scanned by the authenticating device, requesting the user to display a predetermined action by the portion of the user's body to the authenticating device; analyzing a response action by the user to the predetermined action to determine that the response action favorably compares to the predetermined action requested by the authenticating device; and determining that the portion of the user's body remained within view of the authenticating device while the response action was being displayed and analyzed. The method may further include receiving, by the authenticating device, the identification information and the user's biometric characteristic during an enrollment phase. The portion of the user's body may be a hand and the response action is a hand gesture. The hand gesture may be either a static gesture or a dynamic gesture. The method may further include determining that no other objects entered within view of the authenticating device while the response action was being performed. Requesting the user to display a predetermined action by the portion of the user's body may further include the authenticating device randomly selecting the predetermined action. Analyzing the response action may further include determining that the response action is performed by the portion of the user's body. The authenticating device may be a scanner having at least one optical sensor. The method may further include determining that the response action is performed by the user. Determining that the response action is performed by the user may further include determining that the predetermined action is performed by the user and not by an attacker manipulating the user.

In another embodiment, there is provided, a method for biometric authentication, the method including: receiving, by an authenticating device, identification information about a user; scanning the user for a biometric characteristic of a portion of the user's body using the authenticating device; using the identification information, determining that the biometric characteristic belongs to the user; while the user's biometric characteristic is still being scanned by the authenticating device, requesting the user to display a predetermined action by the portion of the user's body to the authenticating device; analyzing a response action by the user to the predetermined action to determine that the response action favorably compares to the predetermined action requested by the authenticating device; determining that the portion of the user's body remained within view of the authenticating device while the response action was being displayed and analyzed; and determining that no other objects entered within view of the authenticating device while the response action was being performed. The portion of the user's body may be a hand and the response action may be a hand gesture. The hand gesture may be either a static gesture or a dynamic gesture. Requesting the user to display a predetermined action by the portion of the user's body may further include the scanner randomly selecting the predetermined action. Analyzing the response action may further include determining that the response action is performed by the portion of the user's body. The authenticating device performing the method may be a scanner having at least one optical sensor.

In yet another embodiment, there is provided, a method for biometric authentication, the method including: receiving, by a scanner, identification information about a user; scanning the user for a biometric characteristic of a hand of the user using the scanner; using the identification information, determining that the hand belongs to the user; while the user's hand is still being scanned by the scanner, requesting the user to display a particular hand gesture to the scanner; analyzing a response hand gesture by the user to the predetermined action to determine that the response hand gesture favorably compares to the predetermined action requested by the scanner; determining that the hand remained within view of the scanner while the hand gesture was being displayed and analyzed; and determining that no other objects entered within view of the scanner while the hand gesture was being performed. The biometric characteristic of the user may include one or more of a fingerprint, a palmprint, a vein pattern, and hand geometry. The hand gesture may be either a static gesture or a dynamic gesture. Requesting the user display a particular hand gesture to the scanner may further include the scanner randomly selecting the particular hand gesture is to be displayed.

FIG. 1 illustrates a highly simplified flat (one-dimensional) biometric scanner 11. FIG. 2 illustrates a highly simplified box-like, multi-dimensional, biometric scanner 14. Scanners 11 and 14 are used to scan a biometric characteristic of a user's body such as hand or face. Biometric scanner 11 can scan an object or portion of person's body, e.g., a hand) from one direction. Biometric scanner 14 can scan from multiple directions at the same time. For convenience, a user's hand 12 is shown being scanned in FIG. 1 and FIG. 2. Other embodiments may apply the described method using other biometric characteristics for other parts of a user's body.

User's hand 12 may be placed above a scanning area of flat scanner 11 as shown in FIG. 1 and inside box-like scanner 14 as shown in FIG. 2. Other scanners may be different. Also, the scanner may be part of another device, such as a smartphone. The scanners may include one or more different types of scanning devices such as a touch screen, infrared detector, an optical scanner such as a video camera, or other scanner types. The scanners may be connected to a user input device such as one or more of a keypad, smartcard reader, display, or touch screen. A fingerprint scanner can be equipped with a camera so that a hand gesture may be performed after the fingerprint scan. For voice authentication and identification, a recording device may be equipped with a detection mechanism for radio waves (including Wi-Fi, Bluetooth, and ultra-wideband (UWB) frequencies). The hand position and configuration can be deduced based on reflections of radio waves as well as absorptions of radio waves and their modifications. As described below in accordance with one embodiment, scanners 11 and 14 are used to identify and authenticate a person using a biometric characteristic of the user's hand(s), such as hand geometry, vein pattern, or fingerprints.

FIG. 3 illustrates a challenge-response exchange between a user and a scanner in accordance with an embodiment. Using a biometric characteristic of a user's hand as an example, at step 1, a user may enter identification (ID) information and put a hand within view of a scanner, such as one of scanners 11 and 14. The scanner may request the hand be positioned in a particular way and may specify either the left or right hand be inserted in the scanner. The ID information may have been entered previously during, for example, an enrollment phase, or may be implicit because the device can only authenticate a single user. For example, a smartphone belongs to one person and only the one person can unlock the smartphone. At step 2, the scanner scans the hand and using the ID information and a biometric characteristic, identifies the hand. If the ID information and biometric characteristic do not agree, then the exchange ends, and access is denied. If the ID information and biometric characteristic favorably compare, then the challenge-response proceeds to step 3 to make sure a replay attack is not underway. To do that, the scanner checks that the hand has been in view of the scanner continuously and was not removed before making the gesture. The scanner also makes sure the hand responding to the challenge gesture is the same hand that was identified at step 2. At step 3, the scanner generates a challenge hand gesture for the user to perform. The challenge gesture may be chosen randomly. There are various ways the challenge can be issued. For example, a message or a picture may be displayed on a screen coupled to the scanner or an audio message may be provided. At step 4, the user responds to the challenge by repeating the hand gesture within view of the scanner. The gesture may be a static gesture where the user configures the hand and then displays the gesture in view of the scanner without movement. An example static gesture may be, e.g., a fist, an "OK" sign, or various letters of the sign alphabet. The gesture may be a dynamic gesture that includes movement of the hand. Also, the gesture may involve both hands. At step 5, the scanner checks that the response to the challenge is correct. This may be done by periodically or continuously authenticating the hand. Also, as an another measure to prevent the replay attack, the scanner may ensure that additional objects did not enter within view of the scanner that may manipulate the hand to make the gesture. If these checks are passed, the scanner considers the user to be authenticated and conscious while being scanned, and no replay attack is underway.

Figure 4:
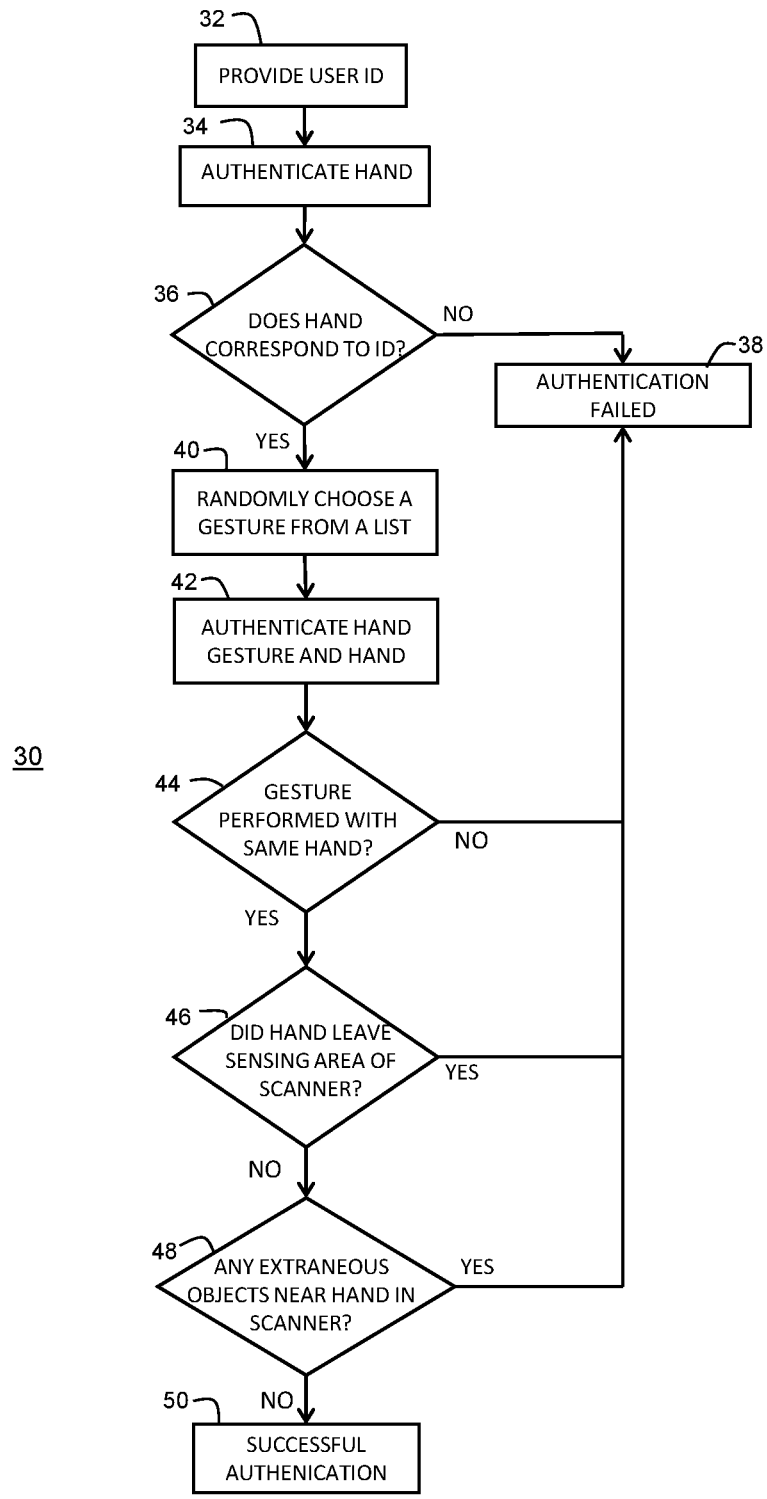
FIG. 4 illustrates a method for biometric authentication in accordance with an embodiment.

FIG. 4 illustrates method 30 for biometric authentication in accordance with an embodiment. As before, method 30 is discussed using a hand of a user's body as an example. In another embodiment, another part or biometric characteristic of the user may be used for authentication. Method 30 begins at step 32. At step 32, a user that wants to be authenticated by a device capable of biometric authentication provides their ID information to the device. In one embodiment, the ID information is provided during an enrollment phase. In response to the ID information, an authenticating device, such as a biometric scanner as illustrated in FIG. 1 or FIG. 2, requests the user to make their hand available to be scanned at step 34. Different techniques can be used to ask the user to make a gesture. For example, the scanner may show a picture of the gesture to be performed. Alternatively, a verbal description of the gesture may be provided. A list of gestures to choose from may be provided by the user. The user can also provide the names for the scanner to use for the gestures. The correct name of a gesture may only be known by the user. At decision step 36, the scanner determines if the scanned biometric of the hand compares favorably with the ID information. If not, then the NO path is taken to step 38, and the biometric authentication fails, method 30 ends without performing a replay attack hand gesture check, and access is not granted to the user. However, if the ID information and the scanned biometric characteristic compare favorably, then the YES path is taken to step 40 to begin checking for a replay attack. At step 40, a hand gesture is randomly chosen from a list. In other embodiments, the hand gesture may be chosen a different way. The requested hand gesture may be static or dynamic. If the hand gesture is static, then no movement of the hand is involved, and the hand is held stationary in view of the scanner. Note that as a precaution against a replay attack, the hand is not to leave the viewing area of the scanner while the hand gesture is being performed. Also, the ID of the user may be continually confirmed while the hand is in view of the scanner and the hand gesture is being authenticated. Also, some biometrics can be accompanied by sound, e.g., clapping, snapping fingers for gestures, and speech for facial recognition. In such case, the scanner may include a microphone and audio circuits to check a sound for loudness, frequency, duration and other properties. Also, synchronization of the sound with the gesture may provide an additional verification. Similarly, a biometric can be double-checked. For gesturing, both hands can be used simultaneously. Both hands can make the same gesture or different gestures at the same time. This approach can increase the security level of the authentication. Moreover, two hands can perform a gesture together, e.g., locking together or clapping. For facial recognition, two cameras can be checked to provide verification using different lighting. At decision step 44, it is determined if the hand gesture was performed by the same hand that was authenticated at decision step 36. If not, the NO path is taken to step 38, the authentication fails and method 30 ends. If the hand is same hand, the YES path is taken to step 46. At decision step 46, it is determined if the hand remained in view of the scanner continuously. If the hand went out of view while being scanned, the YES path is taken back to step 38 where the authentication fails and method 30 ends. The risk being mitigated is that the hand was replaced with another hand during the scan. The hand may have been removed from the scanner's viewing area by an attacker. If the hand did not leave the viewing area, the NO path is taken to decision step 48. At decision step 48, it is determined if any extraneous objects were detected near the hand. Checking the background area around the hand may be viewed as a form of anomaly detection. For example, the area can be checked for additional hands or other objects that can be used to manipulate the hand. If extraneous objects are detected, it may be an attempt by an attacker to manipulate or configure the hand to perform the hand gesture. If extraneous objects are detected, the YES path is taken to step 38 where authentication fails and method 30 ends. If extraneous objects are not detected, the NO path is taken to step 50 and authentication was determined to be successful. Access is then granted to the user. Note that in another embodiment, to increase security it may be desirable to perform the hand gesture replay check even when the authentication initially fails at decision step 38. This may prevent an attacker from knowing whether the authentication failed, or whether their performance of a gesture failed. This may be relevant in a case where the gesture is only known to the user.

Figure 5:
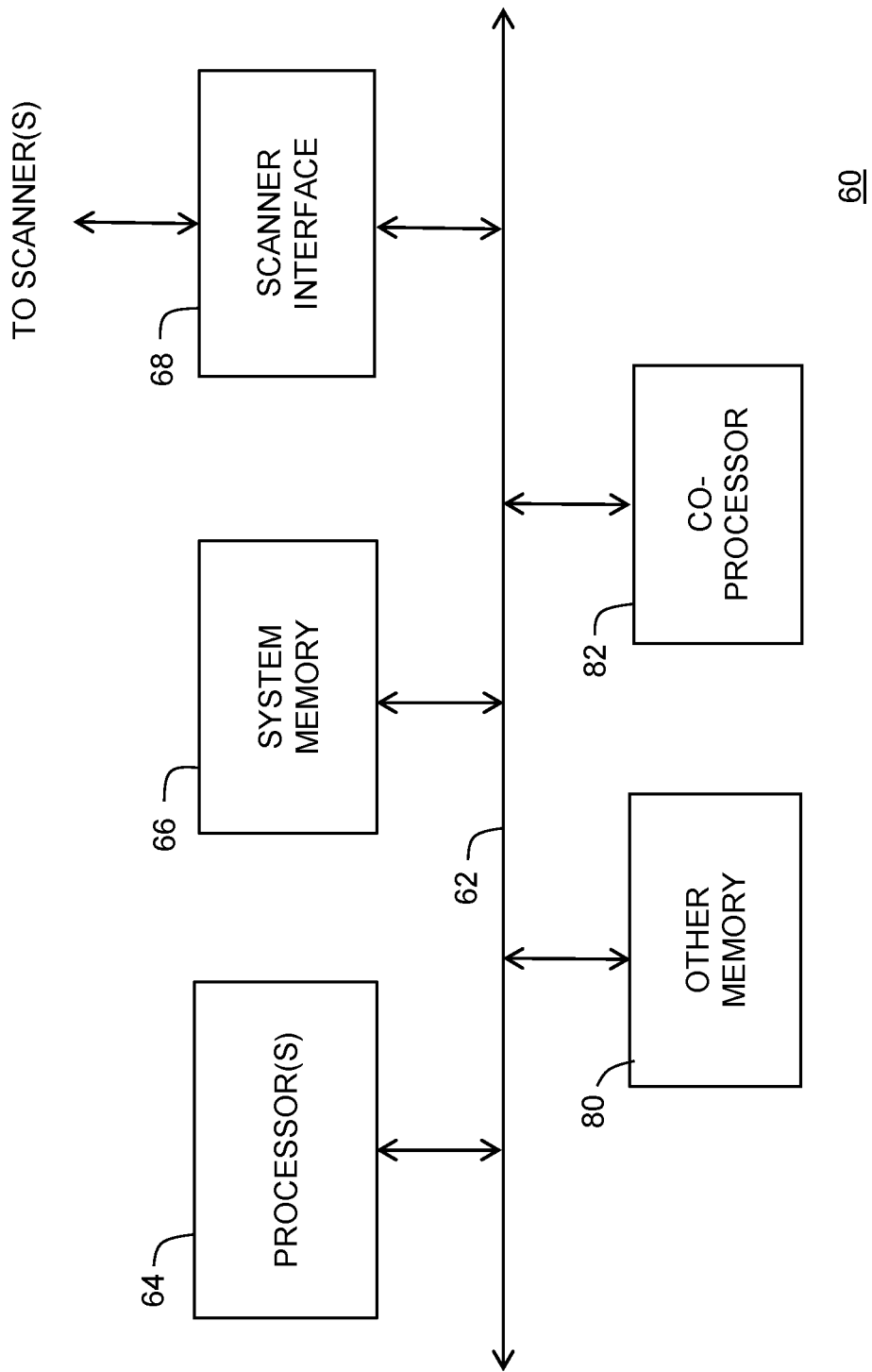
FIG. 5 illustrates a data processing system for use with a scanner.

FIG. 5 illustrates data processing system 60 for use with the scanners of FIG. 1 and FIG. 2. Data processing system 60 may be implemented on one or more integrated circuits and may be used in an implementation of the described embodiments. Data processing system 60 includes bus 62. Connected to bus 62 is one or more processor(s) 64, system memory 66, scanner interface 68, other memory 80, and co-processor 82. The one or more processor(s) 64 may include any hardware device capable of executing instructions stored in memory 66 or other memory 80. For example, processor(s) 64 may be used in a security application used for authentication. Processor(s) 64 may be, for example, a microprocessor, field programmable gate array (FPGA), application-specific integrated circuit (ASIC), or similar device. The guest OS(s) and hypervisor may be implemented in code on processor(s) 64.

System memory 66 may be any kind of memory, such as for example, L1, L2, or L3 cache or system memory. System memory 66 may include one of more of volatile memories such as static random-access memory (SRAM) or dynamic RAM (DRAM), or may include non-volatile memory such as flash memory, read only memory (ROM), or other volatile or non-volatile memory. Also, system memory 66 may be implemented in a secure hardware element. Alternately, system memory 66 may be a hard drive implemented externally to data processing system 60.

Scanner interface 68 may be used to connect data processing system 60 to one or more scanners. Data processing system 60 may provide the processing power necessary to run the authentication method of FIG. 4. Also, scanner interface 68 may be enabled for coupling to a display, a mouse, a keyboard, or other input/output device for operating data processing system 60 and for entering ID information or other information for use in the described authentication method. Various other hardware or configurations for interfacing with a scanner are available.

Co-processor 82 is bi-directionally connected to bus 62. Co-processor 82 may be a special type of one or more co-processors optimized for running encryption/decryption security software according to AES, DES, or other type of encryption algorithm. An algorithm executed on co-processor 82 may be used in the analysis of scanned information received for the scanner and used in method 30. Alternatively, co-processor 82 be used for another purpose, such as graphics processing.

Other memory 80 may include any other memory type in data processing system 60. For example, other memory 80 may include one or more machine-readable storage media for storing program code or instructions for execution by processor(s) 64 or co-processor 82. Also, other memory 80 may be one of more of a hard drive, a solid-state drive (SSD) or other memory type connected to data processing system 60. Both memories 66 and 80 may store data upon which processor(s) 64 may operate. Memories 66 and 80 may also store, for example, encryption, decryption, authentication and verification applications. Memories 66 and 80 may be implemented in a secure hardware element and may be tamper resistant. Other memory 80 may be a part of system memory 66 or may be separate or even external to data processing system 60.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for biometric authentication, the method comprising:
   receiving, by an authenticating device, identification information about a user;
   scanning the user for a biometric characteristic of a portion of the user's body using the authenticating device;
   using the identification information, determining that the biometric characteristic belongs to the user;
   while the user's biometric characteristic is still being scanned by the authenticating device, requesting the user to display a predetermined action by the portion of the user's body to the authenticating device;
   analyzing a response action by the user to the predetermined action to determine that the response action favorably compares to the predetermined action requested by the authenticating device; and
   determining that the portion of the user's body remained within view of the authenticating device while the response action was being displayed and analyzed.

2. The method of claim 1, further comprising receiving, by the authenticating device, the identification information and the user's biometric characteristic during an enrollment phase.

3. The method of claim 1, wherein the portion of the user's body is a hand and the response action is a hand gesture.

4. The method of claim 3, wherein the hand gesture is either a static gesture or a dynamic gesture.

5. The method of claim 1 further comprising determining that no other objects entered within view of the authenticating device while the response action was being performed.

6. The method of claim 1, wherein requesting the user to display a predetermined action by the portion of the user's body further comprises the authenticating device randomly selecting the predetermined action.

7. The method of claim 1, wherein analyzing the response action further comprises determining that the response action is performed by the portion of the user's body.

8. The method of claim 1, wherein the authenticating device is a scanner having at least one optical sensor.

9. The method of claim 1, further comprising determining that the response action is performed by the user.

10. The method of claim 9, wherein determining that the response action is performed by the user further comprises determining that the predetermined action is performed by the user and not by an attacker manipulating the user.

11. A method for biometric authentication, the method comprising:
    receiving, by an authenticating device, identification information about a user;
    scanning the user for a biometric characteristic of a portion of the user's body using the authenticating device;
    using the identification information, determining that the biometric characteristic belongs to the user;
    while the user's biometric characteristic is still being scanned by the authenticating device, requesting the user to display a predetermined action by the portion of the user's body to the authenticating device;
    analyzing a response action by the user to the predetermined action to determine that the response action favorably compares to the predetermined action requested by the authenticating device;
    determining that the portion of the user's body remained within view of the authenticating device while the response action was being displayed and analyzed; and
    determining that no other objects entered within view of the authenticating device while the response action was being performed.

12. The method of claim 11, wherein the portion of the user's body is a hand and the response action is a hand gesture.

13. The method of claim 12, wherein the hand gesture is either a static gesture or a dynamic gesture.

14. The method of claim 11, wherein requesting the user to display a predetermined action by the portion of the user's body further comprises the scanner randomly selecting the predetermined action.

15. The method of claim 11, wherein analyzing the response action further comprises determining that the response action is performed by the portion of the user's body.

16. The method of claim 11, wherein the authenticating device performing the method is a scanner having at least one optical sensor.

17. A method for biometric authentication, the method comprising:
    receiving, by a scanner, identification information about a user;
    scanning the user for a biometric characteristic of a hand of the user using the scanner;
    using the identification information, determining that the hand belongs to the user;

while the user's hand is still being scanned by the scanner, requesting the user to display a particular hand gesture to the scanner;

analyzing a response hand gesture by the user to the predetermined action to determine that the response hand gesture favorably compares to the predetermined action requested by the scanner;

determining that the hand remained within view of the scanner while the hand gesture was being displayed and analyzed; and determining that no other objects entered within view of the scanner while the hand gesture was being performed.

18. The method of claim 17, wherein the biometric characteristic of the user comprises one or more of a fingerprint, a palmprint, a vein pattern, and hand geometry.

19. The method of claim 17, wherein the hand gesture is either a static gesture or a dynamic gesture.

20. The method of claim 17, wherein requesting the user display a particular hand gesture to the scanner further comprises the scanner randomly selecting the particular hand gesture is to be displayed.

\* \* \* \* \*